INVENTORS
J. O. BEEKER
J. C. TULLOSS

United States Patent Office 3,035,114
Patented May 15, 1962

3,035,114
SPLICE-SLEEVE ASSEMBLIES AND METHODS
OF MAKING THE SAME
James O. Beeker and Joseph C. Tulloss, Baltimore, Md., assignors to Western Electric Company, Incorporated, New York, N.Y., a corporation of New York
Filed Aug. 12, 1959, Ser. No. 833,326
6 Claims. (Cl. 174—84)

This invention relates to splice-sleeve assemblies and methods of making the same. More particularly, the invention relates to splice-sleeve assemblies of the type used for splicing together stripped ends of a pair of thermoplastic-insulated, electrical conductors to provide an electrically conductive joint having a moisture-impervious covering of molded thermoplastic insulation, and to methods of making such sleeve assemblies.

Because of the large number of splices made in the power-transmission and communication industries, each step that can be eliminated by persons performing the splicing procedure is of great economical importance to industry. Further, it is desirable to make strong, moisture-impervious splices having as small an outside diameter as possible to prevent the splices from occupying excessive amounts of space and having adverse effects on the electrical characteristics of cables when the conductors being spliced form a portion of a multiconductor cable.

It is, therefore, an object of the present invention to provide improved splice-sleeve assemblies of the type used for splicing together stripped ends of a pair of thermo-plastic insulated, electrical conductors to provide an electrically conductive joint having a moisture-impervious covering of molded thermoplastic insulation.

It is another object of the present invention to provide improved methods of making such sleeve assemblies.

A splice-sleeve assembly embodying certain features of the present invention may include an internal, metallic, tubular member into each end of which one stripped end of a pair of insulated conductors to be joined may be inserted, and a covering of thermoplastic-insulating material having ends thereof extending beyond the ends of the internal, metallic, tubular member. The ends of the covering of thermoplastic material are slit longitudinally to form furcated portions which may be retroflexed so that the end of the insulation remaining on each conductor to be joined may be inserted into an end of the sleeve assembly into abutment with the end of the internal tubular member without having to provide the internal diameter of the covering of the sleeve assembly with as large an outer diameter as the outer diameter of the insulation on the conductors to be joined.

The thermoplastic covering of the sleeve assembly is preferably covered with a mold-releasing agent, such as cellophane tape. If the cellophane tape is utilized as the mold-releasing agent, the tape is wrapped preferably spirally around the thermoplastic covering during the formation of the sleeve assembly.

A method of making such splice-sleeve assemblies embodying certain features of the present invention may include forming an indefinite length of a laminated tubular structure by extruding an insulating covering of thermoplastic material over an indefinite length of a malleable, ductile, electrically conductive, metallic tubing. The covering is cut circumferentially at points spaced at predetermined distances along the axis thereof, and is slit longitudinally a predetermined distance on each side of each of the circumferential cuts to permit removal of sections of the metallic tubing of a predetermined length. The sections of the metallic tubing in the area of the slit covering are removed to form a series of splice-sleeve assemblies having metallic sleeves of a predetermined length with the slit ends of the covering projecting beyond the ends of the metallic sleeves.

Other objects and features of the present invention will be more readily understood from the following detailed description of specific embodiments thereof, when read in conjunction with the accompanying drawings, in which.

Figure 1:
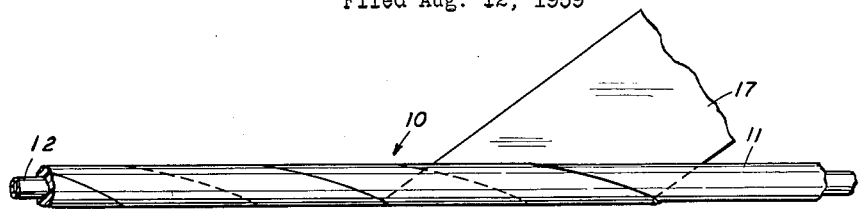
FIG. 1 is a view of a portion of an indefinite length of a laminated tubular structure from which sleeve assemblies embodying certain features of the present invention are formed.

Referring now to the drawings, and more particularly to FIG. 1 thereof, it may be seen that in the process of making a splice-sleeve assembly, designated generally by the numeral 9, an indefinite length of a laminated tubular structure, designated generally by the numeral 10, may be formed by extruding an insulating covering 11 of thermoplastic material over an indefinite length of a suitable, malleable, ductile, electrically conductive, metallic tubing 12. The metallic tubing 12 may be made of any suitable metal, such as annealed copper, bronze, brass or aluminum, but is constructed preferably of the same type of material as the conductive cores 13—13 of insulated conductors, designated generally by the numerals 14—14, to be joined. The tubing 12 should have an internal diameter of a sufficient size to accommodate the size of the conductive cores 13—13 to be joined by the splice-sleeve assembly 9, and an outer diameter sufficiently great to provide a joint of the desired mechanical strength and electrical conductivity. The thermoplastic-insulating covering 11, which is extruded over the tubing 12 in a continuous extrusion process, is preferably thermoplastic material, such as polyethylene or polyvinyl chloride, which is identical to the insulation of the insulated conductors 14—14 to be joined. The wall thickness of the insulating covering 11 preferably should be sufficient to form a reservoir of thermoplastic material for a molding operation during the formation of a splice, designated generally by the numeral 16, in which the splice-sleeve assembly 9 is utilized.

Figure 2:
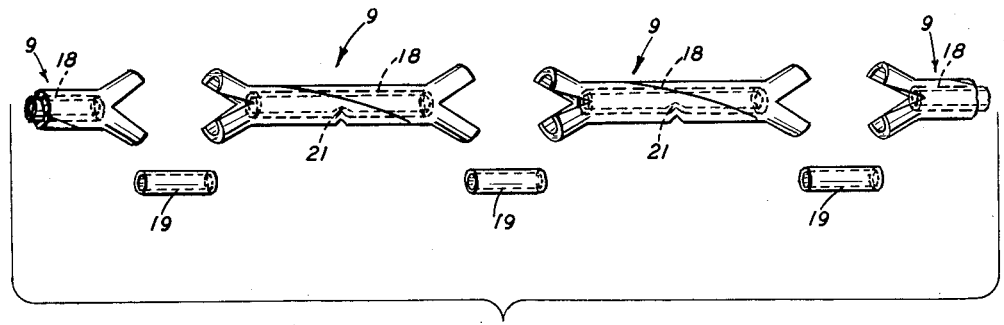
FIG. 2 is a view of the laminated tubular structure of FIG. 1, from which portions have been removed to form a series of sleeve assemblies embodying certain features of the present invention.
Figure 3:
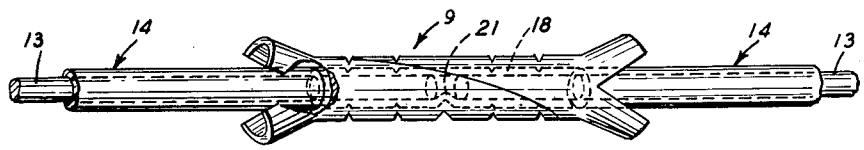
FIG. 3 is an enlarged view of a sleeve assembly, embodying certain features of the present invention, which has been crimped in place on stripped ends of insulated conductors.
Figure 4:
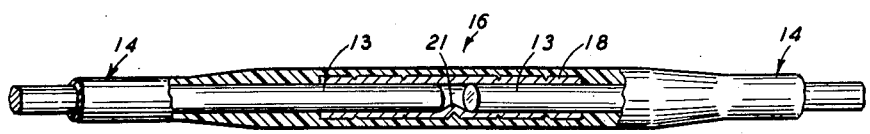
FIG. 4 is an enlarged view of a completed moisture-impervious splice made with a sleeve assembly embodying certain features of the present invention.

A strip of a suitable mold-releasing agent 17, such as cellophane, "Mylar," or polyester film tape, may be wrapped spirally around the thermoplastic-covered, metallic tubing 12 to form an indefinite length of continuously insulated, laminated, tubular structure 10. The overlapping edges of the spirally wrapped tape 17 are heat-sealed to form a continuous cylinder and prevent it from coming loose unintendedly. Portions 19—19 (FIG. 2) of the tubing 12 of the continuously insulated, laminated, tubular structure 10 of a desired length are removed therefrom by an undercutting process so that slit portions of the mold-release-covered, insulating covering 11 project beyond both ends of a metallic sleeve 18 formed by the remaining portions of the metallic tubing 12. This may be accomplished by cutting the outer layer of mold-releasing agent 17 and insulating covering 11 circumferentially at predetermined points and slitting the mold-releasing-agent-enclosed covering 11 longitudinally predetermined distances on each side of the circumferential cuts to permit the removal of portions 19—19 of the metallic tubing 12 of predetermined lengths adjacent to adjacent ends of the sleeves 18—18 to be formed. In this way the longitudinally slit ends of the outer layer of material project beyond the ends of the metallic sleeves 18—18.

The length of the portions 19—19 of the tubing 12 to be discarded may be determined by the amount of thermoplastic material desired in the projecting ends of the covering 11. The length of the portion of the tubing 12 utilized to form the metallic sleeves 18—18 may be determined by the tensile strength, area and resistance of the contact between each of the sleeves 18—18 and bared ends of the joined insulated conductors 14—14 desired in the finished splice 16.

Near the center of each of the thus-formed metallic sleeves 18—18, the wall thereof may be indented to form an obstruction 21 which limits movement of the conductive cores 13—13 of the insulated conductors 14—14 to be joined into each end of the sleeve 18. The indentation 21 may extend into the metallic sleeve 18 a distance of approximately one-third of the internal diameter of the tubing 12.

*Example*

In a typical splice-sleeve assembly to be utilized for joining two polyethylene-insulated, 19-gauge conductors having a diameter over dielectric of approximately 0.075 inch, the metallic sleeve 18 is approximately one inch long having an inside diameter of approximately 0.040 inch and an outside diameter of approximately 0.076 inch. The wall thickness of the insulating covering 11 is approximately 0.040 inch and the length of the slit ends of the covering 11 projecting beyond each end of the metallic sleeve 18 is approximately 0.16 inch. This would permit the molded portion of the completed splice 16 to be approximately two inches long with a diameter over the dielectric of approximately 0.116 inch. The width of the tape 17 of the mold-releasing agent is approximately ⅝ inch, and is wrapped on the covering 11 with a wrap angle of approximately 35 degrees so that adjacent edges of the tape 17 are overlapped approxiamtely 50 percent.

In the formation of a completed splice 16, a portion of the insulation on the ends of the insulated conductors 14—14 to be joined, equivalent to approximately one-half of the length of the metallic sleeve 18, should be stripped from the ends of the conductive cores 13—13. The stripped ends of the conductive cores 13—13 may be inserted into the ends of the metallic sleeve 18 with the slit portions of the insulating covering of the sleeve assembly 9, which project beyond the metallic sleeve 18, overlapping the insulation on the conductors 14—14.

The splice-sleeve assembly 9 is secured in place on the bared ends of the conductive cores 13—13 by indenting the metallic sleeve 18 and pushing portions thereof into intimate contact with the end portions of the conductive cores 13—13 by means of an appropriate crimping tool (not shown), such as is disclosed in Bell System Practices, Section G85.126.3, Issue 1, March 1957, of Outside Plant Construction and Maintenance, copyrighted in 1957 by American Telephone and Telegraph Company. Toothed jaws may be utilized on the crimping tool to indent the metallic sleeve 18 at several points by puncturing the insulating and mold-releasing-agent coverings of the splice-sleeve assembly 9.

A properly dimensioned, portable mold, heated by electrical or other suitable means and having a cavity complementary to the outside dimensions of the completed splice 16, is used to shape and seal the splice 16. The reservoir of insulating material in the covering 11 and the split projecting ends thereof flows into voids left by the crimping tool and over the ends of the metallic sleeve 18. Thus, a continuously insulated jacket is created over the conductive cores 13—13 and the metallic sleeve 18 to provide a moisture-impervious, electrically conductive splice 16 having desired physical and electrical characteristics.

The term "thermoplastic," as used in the specification and appended claims, is employed in its generic sense and is intended to include any plastic insulating material that can be molded under the influence of heat whether or not it is capable of becoming plastic again upon subsequent reheating. For purposes of the invention, it is only necessary that the insulating material of the covering 11 becomes plastic when initially heated during the formation of the splice 16.

It is to be understood that the above-described arrangements are simply illustrative of the application of the principles of the present invention. Other arrangements may be devised by those skilled in the art which will embody the principles of the invention and fall within the spirit and scope thereof.

What is claimed is:

1. A splice-sleeve assembly of the type utilized for making molded, moisture-impervious, electrically conductive splices, which comprises an internal, ductile, malleable, electrically conductive, metallic sleeve, and an outer tubular covering of thermoplastic-insulating material having the ends thereof projecting beyond the ends of the metallic sleeve to form a reservoir of thermoplastic material for facilitating a molding process when the assembly is utilized to form a splice, the projecting ends of the insulating material being slit axially thereof to form furcations which may be retroflexed when used to form an electrically conductive splice having a moisture impervious covering of molded, thermoplastic insulation.

2. A splice-sleeve assembly of the type utilized for making molded, impervious, electrically conductive splices, which comprises an inner, electrically conductive, metallic sleeve, an intermediate sleeve of thermoplastic-insulating material, and an outer sleeve of helically spirally wrapped tape of mold-releasing agent, the ends of the intermediate and outer sleeves projecting beyond the ends of the inner metallic sleeve to form a reservoir of thermoplastic material for facilitating a molding process when the assembly is utilized to form a splice, the projecting ends of the intermediate and outer sleeves being slit longitudinally to permit bared ends of conductors to be joined to be inserted into the ends of the inner metallic sleeve with the end of the insulation remaining on the conductors in abutment with the ends of the inner metallic tube and the slit portions of the intermediate and outer sleeves overlying the insulation on the conductors.

3. A sleeve assembly of the type used for making a molded, impervious, electrically conductive joint between a plurality of insulated conductors, which comprises an internal metallic tubular member into the ends of which stripped ends of a plurality of insulated conductors to be joined may be inserted, a covering of thermoplastic-insulating material having the ends thereof extending beyond the ends of the internal tubular member to form a reservoir of thermoplastic material for facilitating a molding process when the assembly is utilized to form a splice, the ends of the covering of thermoplastic material being slit longitudinally to form furcated portions which may be retroflexed so that the ends of the insulation on each conductor to be joined may be inserted into an end of the sleeve assembly into abutment with the end of the internal tubular member without having to provide the internal diameter of the covering of the sleeve assembly with as large an outer diameter as the outer diameter of the insulation on the conductors to be joined, and a mold-releasing agent in tape form wrapped helically spirally around the thermoplastic covering with adjacent edges of the spirally wrapped tape being overlapped and fused together.

4. A splice-sleeve assembly of the type utilized for making molded, impervious, electrically conductive splices, which comprises an inner, electrically conductive, metallic sleeve, a radially inwardly projecting obstruction formed in the metallic sleeve, an intermediate sleeve of thermoplastic-insulating material, and an outer sleeve of helically spirally wrapped tape of mold-releasing agent, the ends of the intermediate and outer sleeves projecting beyond the ends of the inner metallic sleeve to form a reservoir of thermoplastic material for facilitating a molding process when the assembly is utilized to form a splice, the projecting ends of the intermediate and outer sleeves being slit longitudinally to permit bared ends of conductors to be joined to be inserted into the ends of the inner metallic sleeve with the end of the insulation remaining on the conductors in abutment with the ends of the inner metallic tube and the slit portions of the intermediate and outer sleeves overlying the insulation on the conductors.

5. The method of making a splice-sleeve assembly of the type used for splicing together stripped ends of a pair of thermoplastic-insulated electrical conductors to provide an electrically conductive joint having a moisture-impervious covering of molded-thermoplastic insulation, which comprises forming an indefinite length of laminated tubular structure by extruding an insulating covering of thermoplastic material over an indefinite length of a malleable, ductile, electrically conductive metallic tubing, cutting the covering circumferentially at points spaced at predetermined distances along the axis thereof, slitting the covering longitudinally a predetermined distance on each side of the circumferential cut to permit removal of sections of the metallic tubing of a predetermined length, and removing the sections of the tubing in the area of the slit covering to form a series of splice-sleeve assemblies having metallic sleeves of a predetermined length with the slit ends of the covering projecting beyond the ends of the metallic sleeves to form a reservoir of thermoplastic material for facilitating a molding process when the assembly is utilized to form a splice.

6. The method of making splice-sleeve assemblies of the type used for splicing together stripped ends of a pair of thermoplastic-insulated electrical conductors to provide an electrically conductive joint having a moisture-impervious covering of molded-thermoplastic insulation, which comprises forming an indefinite length of laminated tubular structure by extruding an insulating covering of thermoplastic material over an indefinite length of a malleable, ductile, electrically conductive, metallic tubing and wrapping a strip of mold-releasing agent helically spirally around the thermoplastic-insulating covering, heat sealing the overlapping edges of the spirally wrapped strip of mold-releasing agent, cutting the mold-releasing-agent-enclosed covering circumferentially at points spaced at predetermined distances along the axis thereof, slitting the mold-releasing agent and the covering longitudinally a predetermined distance on each side of the circumferential cut to permit removal of sections of the metallic tubing of a predetermined length, and removing the sections of the metallic tubing in the area of the slit covering to form a series of splice-sleeve assemblies having metallic sleeves of a predetermined length with the slit ends of the covering projecting beyond the ends of the metallic sleeves to form a reservoir of thermoplastic material for facilitating a molding process when the assembly is utilized to form a splice.

References Cited in the file of this patent
UNITED STATES PATENTS

| | | |
|---|---|---|
| 2,478,082 | Broske | Aug. 2, 1949 |
| 2,692,422 | Pierce | Oct. 26, 1954 |
| 2,725,615 | Edwards | Dec. 6, 1955 |
| 2,774,810 | Ritter | Dec. 18, 1956 |
| 2,832,816 | Curtiss | Apr. 29, 1958 |
| 2,885,735 | Dittmore et al. | May 12, 1959 |